Nov. 3, 1936.  L. J. HAAGER  2,059,731
WEED CUTTER
Filed Aug. 5, 1935
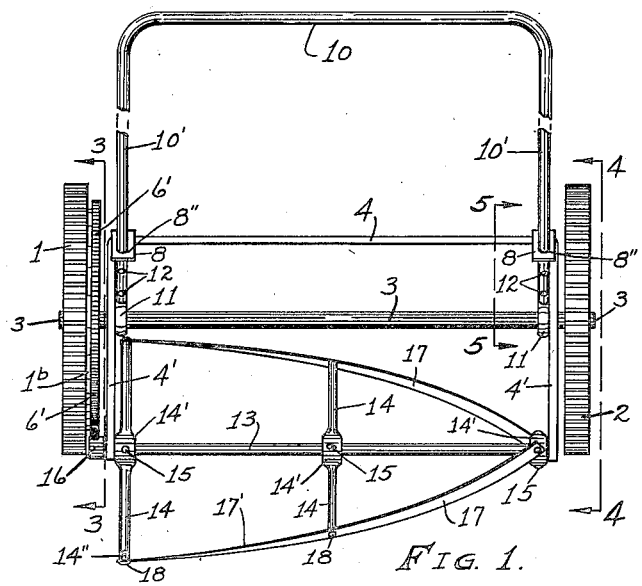
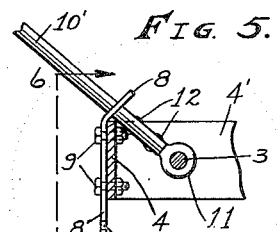
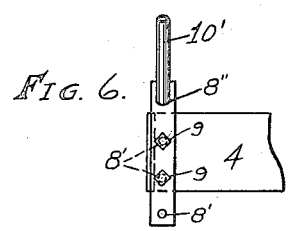
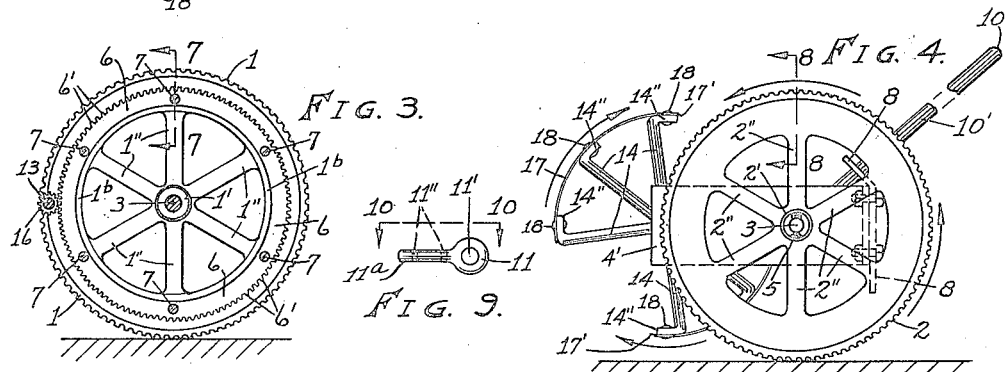
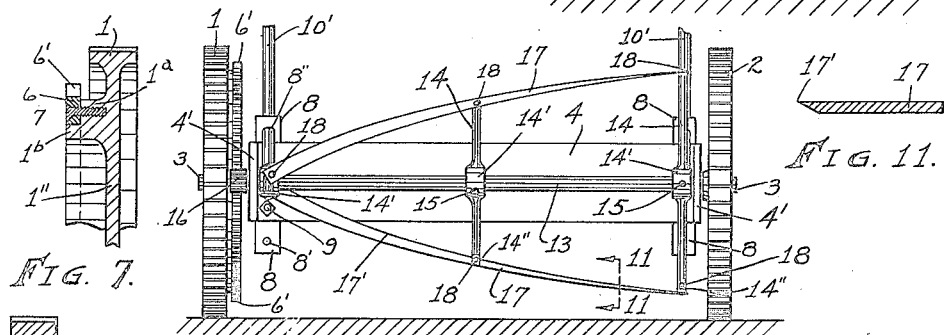
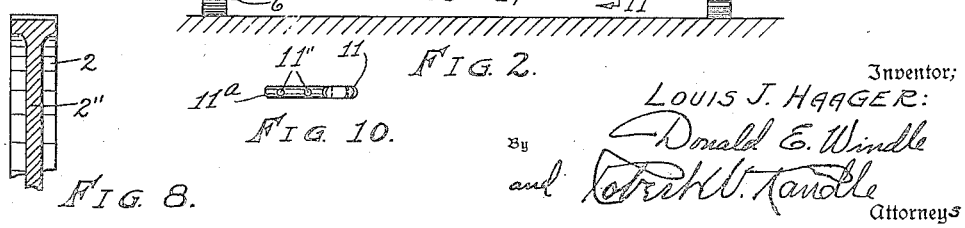
Inventor;
LOUIS J. HAAGER:
By Donald E. Windle
and Patrick W. Randle
Attorneys Patented Nov. 3, 1936

2,059,731

UNITED STATES PATENT OFFICE 2,059,731

WEED CUTTER

Louis J. Haager, Richmond, Ind.

Application August 5, 1935, Serial No. 34,650

3 Claims. (Cl. 56—252)

This invention relates to weed cutting machines which are economically manufactured, and which are efficient in the operation thereof.

The principal object of my invention is the provision of a weed cutting machine which will effectively and efficiently cut weeds and other undesirable plants which have grown too tall to be cut with the conventional lawn mower.

Another object of the invention is to provide a weed cutting machine which is simple of construction and operation, which requires but a minimum amount of attention, and for which the upkeep is practically nil.

Other objects and advantages of my invention will suggest themselves in the course of the following description, and that which is new will be correlated in the appended claims.

The most satisfactory manner of carrying out the principles of my invention in a practical, comprehensive, and efficient manner is shown in the accompanying sheet of drawing, in which—

Figure 1 is a top plan view of my weed cutter.

Figure 2 is a front view of the same.

Figure 3 is a detail section taken on line 3—3 of Figure 1, and showing the inner side of the drive wheel in elevation.

Figure 4 is a left side elevation of the machine taken from line 4—4 of Figure 1.

Figure 5 is a detail section taken on line 5—5 of Figure 1, and showing the handle securing and adjusting means in elevation.

Figure 6 is a detail rear elevation of one of the handle-adjusting brackets, taken from line 6—6 of Figure 5.

Figure 7 is a detail section, taken on line 7—7 of Figure 3, through a portion of the drive wheel.

Figure 8 is a detail section, taken on line 8—8 of Figure 4, through a portion of the idler wheel.

Figure 9 is a side elevation of one of the handle-securing collars.

Figure 10 is a top plan view of the same, taken from line 10—10 of Figure 9.

Figure 11 is a detail cross section through one of the blade members taken on line 11—11 of Figure 2.

Similar indices designate like parts throughout the several views.

In order that the construction, the operation, and the advantages of my invention may be more fully understood and appreciated, I will now take up a detailed description thereof, in which I will set forth the same as fully and as comprehensively as I may.

In the drawing, 1 designates a ground wheel having its periphery serrated, a concentrically located hub 1' with the spokes 1" extending outwardly from the hub 1' to the wheel 1 and formed integrally therewith. The raised portion 1a is formed integrally with the wheel and is concentric with the hub thereof. A flange 1b is formed integrally with the raised portion 1a and forms an outwardly projecting rim around the inner portion 1a, and the purpose of which will be hereinafter set forth. One end of the central shaft 3 extends through the hub 1' of the wheel 1 and said wheel is secured thereon by means of a cotter pin 5. The opposite end of the shaft 3 is adapted to extend through the hub 2' of the ground wheel 2, and a cotter pin 5 is used to secure the wheel 2 on the shaft 3. The wheel 2, the hub 2', and the spokes 2" are similar to the wheel 1, the hub 1', and the spokes 1" with the exception of the raised portion 1a and the flange 1b which are not necessary on the idler wheel 2, and are therefore omitted from the wheel 2.

The frame member 4 is spaced between the wheels 1 and 2, the same having the forwardly extending arms 4' formed integrally therewith and forming a U-shaped frame. Each of the forwardly extending arms 4' has an aperture formed therethrough for the reception of the central shaft 3. Near the forward end portion of each of the arms 4' a second aperture is formed, and through which the end portions of the reel shaft 13 extend.

The gear wheel 6 is rigidly secured to the wheel 1 by means of the threaded screws 7 extending through the gear wheel 6 and into the raised portion 1a. The outwardly projecting rim 1b serves to maintain the gear wheel 6 in concentric relation with the hub 1' and the central shaft 3. The gear wheel 6 has the teeth 6' formed around the periphery thereof.

The handle-holding and adjusting brackets 8 have apertures 8' formed therethrough, the same being formed in alignment with corresponding apertures formed through the portion 4 of the frame member, and through which the bolts 9 extend, and thereby rigidly securing the brackets 8 to the member 4. The brackets 8 are adjustable upwardly and downwardly with relation to the member 4 by aligning different sets of the apertures 8' with the apertures formed through the member 4.

The handle of my weed cutting machine is formed preferably of hollow tubing, and is comprised of the horizontally disposed or cross portion 10 together with the forwardly extending portions 10', each of which has apertures formed therethrough near the forward ends thereof.

The handle securing collars 11 each have a large aperture 11' formed therethrough, and through which the central shaft 3 extends. Each of the collars 11 has a portion 11a projecting therefrom and which is adapted to be inserted into the end of one of the forwardly extending portions 10' of the handle member. Each of the projecting portions 11a has the apertures 11" formed therethrough, the same registering with the apertures formed through the handle portions 10'. The handle portions 10' are rigidly secured on the projecting portions 11a by means of the rivets 12, or by other suitable means.

The reel shaft 13 extends transversely across the machine with the end portions thereof extending through apertures formed through the end portions of the forwardly projecting arms 4'. The reel brackets 14 have apertures formed through the hub portions 14', and through which the reel shaft 13 extends, the brackets being rigidly secured to the shaft 13 by means of the rivets 15 extending through the hub portion 14' and the shaft 13. Each of the brackets 14 has a foot portion 14" formed integrally therewith, and which extend at substantially right angles to the major portion of the respective brackets.

The small gear 16 is rigidly secured to one end of the shaft 13, the gear being adapted to mesh with the teeth 6' of the large gear wheel 6, and to be rotated thereby.

The reel blades 17 are rigidly secured to the foot members 14" by means of the rivets 18 extending through apertures formed through the blades 17 and the foot members 14". Each of the blades has a sharpened cutting edge 17', as shown in Figure 11.

The operation, or utilization of my weed cutting machine is substantially as follows—

As the machine is pushed forwardly by means of the handle member 10, the ground wheels 1 and 2 rotate in the direction as shown by the arrows concentric therewith in Figure 4, and the large gear wheel 6 being rigidly secured to the ground or drive wheel 1 is rotated therewith. The small gear 16, being in mesh with the teeth 6' of the gear wheel 6, is rotated thereby and causes the reel shaft, carrying the reel brackets 14 and the reel blades 17, to rotate. It will be noted, by the arrows which are concentric with the reel, that the reel revolves in the opposite direction to that of the ground wheels 1 and 2. As the machine is pushed forwardly, the reel blades sever weeds and the like with which they come in contact, especially weeds which are undesirable in lawns, such as for instance, the buckhorn plant.

My machine is not designed to replace lawn mowers in cutting grass, but is designed to cut plants which have grown too tall to be cut by a lawn mower.

One of the most important features of my machine is the novel and simple arrangement of the reel, which normally rotates in the opposite direction from the conventional type of mower or cutter reel, also no cutter bar is required in connection with my reel, as the same revolves at a very high speed when in motion.

I desire that it be understood that minor changes may be made in the several details, and in the arrangement of the parts herein shown and described, without departing from the spirit of my invention or sacrificing any of the advantages thereof which are new and useful, and which involve invention.

Having now fully shown and described my invention, what I claim and desire to secure by Letters Patent of the United States, is:

1. In a weed cutting machine having a frame member with a central shaft extending therethrough, a drive wheel revolvably secured on one end of said central shaft, an idler wheel revolvably secured on the opposite end of said central shaft, a tubular handle member, collars encircling said central shaft with each having an extended portion projecting therefrom, said extended portion being inserted into the end portions of the tubular handle member and rigidly secured therein, and brackets adjustably securing said handle member with relation to the frame member.

2. In a weed cutting machine having a pair of ground wheels revolvably positioned on a central shaft, a U-shaped frame member supported by the central shaft and maintaining said ground wheels in spaced relation with each other, handle supporting and adjusting brackets removably secured to the frame member, each of said brackets having a large aperture formed through the upper portion thereof for the reception of a handle and with a plurality of equally spaced smaller apertures formed in alignment with each other, and means for removably securing each of said brackets to said U-shaped frame member through the smaller apertures.

3. In a weed cutter having a frame member supported by a pair of ground wheels mounted at each end of a central shaft, a gear wheel rigidly secured to one of said ground wheels and revolvable therewith, a reel shaft with each end thereof extending through the frame member, said reel shaft being positioned forwardly of and parallel with the central shaft, a gear rigidly secured on one end of said reel shaft and meshing with said gear wheel, reel blades spaced from said reel shaft by a plurality of bracket members, said reel blades and bracket members forming a revolvable reel, and the lower side of said reel being adapted to rotate in a forwardly direction when the weed cutter is moved forwardly and adapted to rotate rearwardly when the weed cutter is moved in a rearwardly direction.

LOUIS J. HAAGER.